Jan. 9, 1968   J. MARLOW ET AL   3,363,161
MOTOR CONTROL SYSTEM FOR CONTROLLING FLUID FLOW
Filed Feb. 12, 1962   2 Sheets-Sheet 1
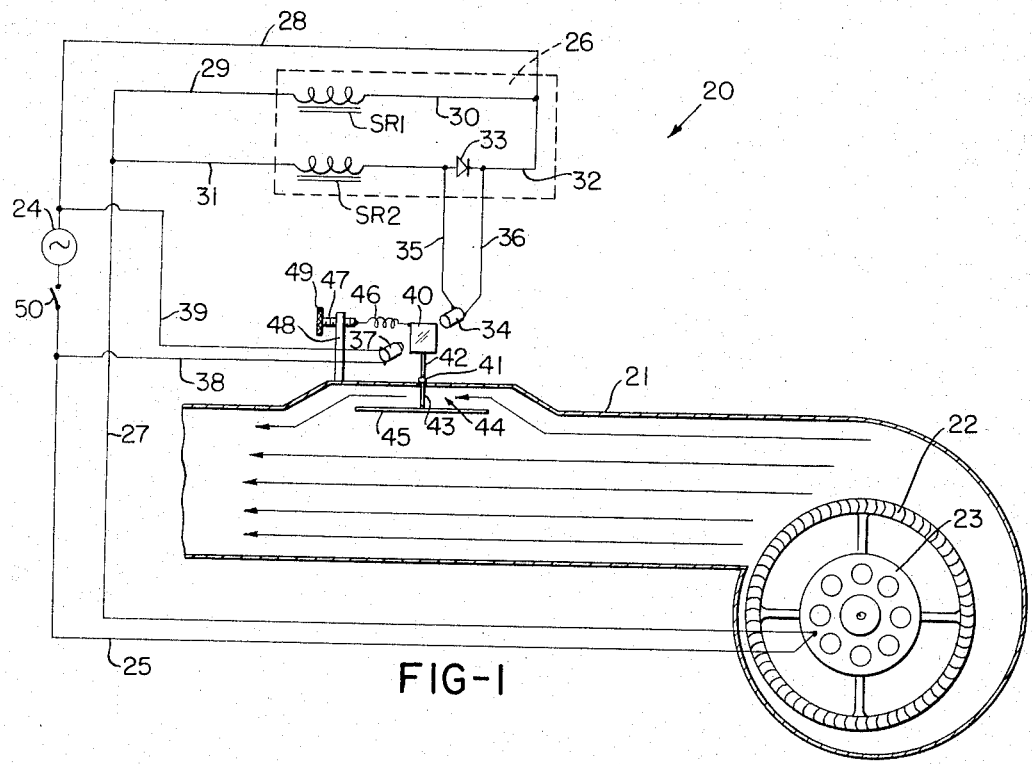
FIG-1
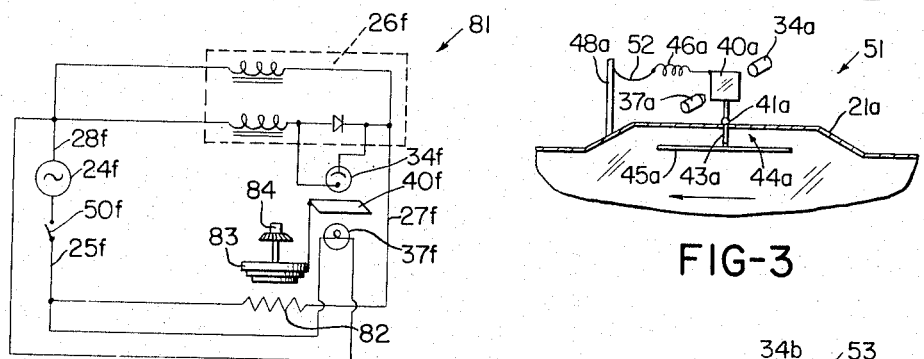
FIG-2
FIG-3
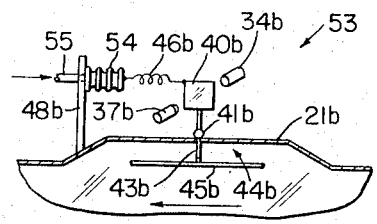
FIG-4
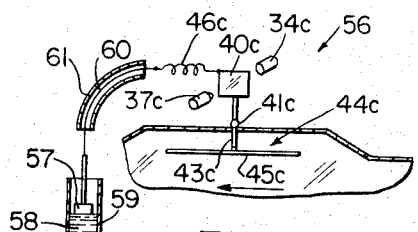
FIG-5
*INVENTORS*
JACOB MARLOW
WILLIAM M. HARCUM
BY
Robert R. Candor
ATTORNEY

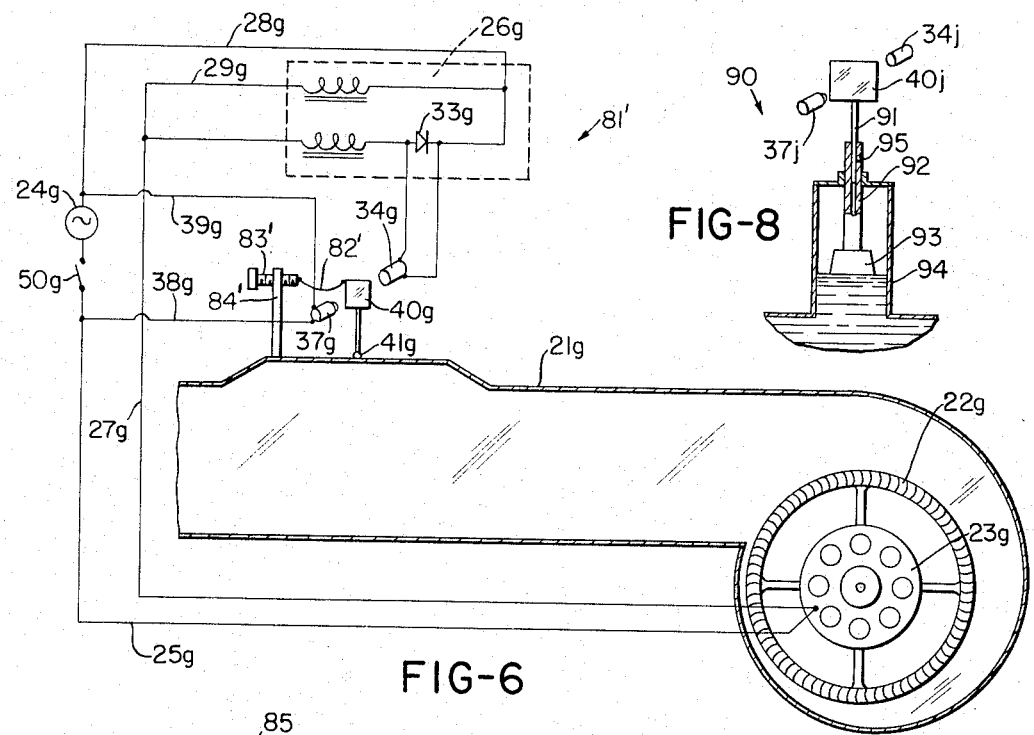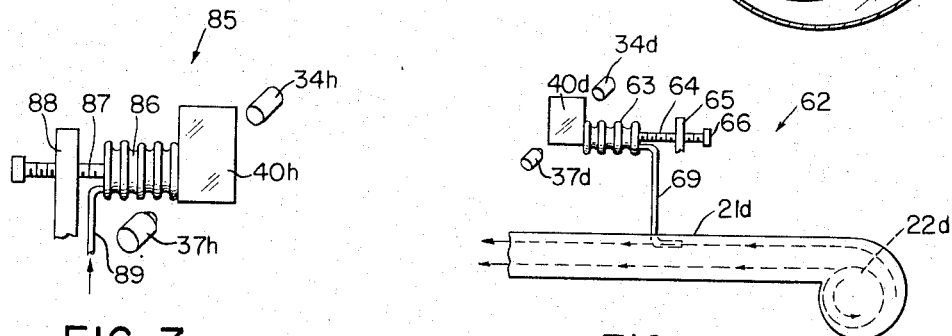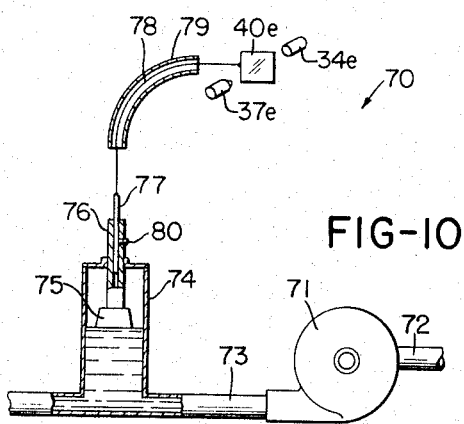

United States Patent Office 3,363,161
Patented Jan. 9, 1968

3,363,161
MOTOR CONTROL SYSTEM FOR CONTROLLING
FLUID FLOW
Jacob Marlow, King of Prussia, and William M. Harcum, Blue Bell, Pa., assignors to Robertshaw Controls Company, a corporation of Delaware
Filed Feb. 12, 1962, Ser. No. 172,417
2 Claims. (Cl. 318—481)

This invention relates to improved apparatus for controlling the output of a variable load device in accordance with various selected conditions.

For example, one embodiment of this invention provides means for maintaining the fluid flow delivered by a variable output device at a level selected by various control means.

In another embodiment of this invention, a temperature changing device, such as a heating means or a cooling means, is controlled in such a manner that the room or rooms being affected by the output of the temperature changing device can be maintained at a substantially constant temperature.

In certain of the systems of this invention, the output of the variable load device is controlled in response to the function of the output to form closed loop feedback systems of the negative or positive type while other of the systems of this invention comprise open loop types where the output of the variable load device is varied in response to independent means.

Accordingly, it is an object of this invention to provide improved systems having one or more of the novel features of this invention set forth above and hereinafter shown or described.

Other objects, uses and advantages of this invention are apparent from a reading of this description which proceeds with reference to the accompanying drawings forming a part thereof and wherein:

FIGURE 1 is a schematic view illustrating one of the systems of this invention.

FIGURE 2 is a view similar to FIGURE 1 illustrating another system of this invention.

FIGURES 3, 4, and 5 are fragmentary views similar to FIGURE 1 illustrating other embodiments of this invention.

FIGURE 6 is a view similar to FIGURE 1 and illustrates still another embodiment of this invention.

FIGURES 7 and 8 are fragmentary views similar to FIGURE 6 illustrating other embodiments of this invention.

FIGURES 9 and 10 are fragmentary views similar to FIGURE 1 illustrating other embodiments of this invention.

While the various features of this invention are hereinafter illustrated and described as being incorporated into a particular system, it is to be understood that the various features of this invention can be utilized singly or in any combination thereof to form other systems as desired.

Therefore, this invention is not to be limited to only the embodiments illustrated in the drawings, because the drawings are merely utilized to illustrate some of the wide variety of uses of this invention.

Referring now to FIGURE 1, an improved control system of this invention is generally indicated by the reference numeral 20 and comprises a duct 21 adapted to convey fluid delivered by an impeller 22 rotated by a variable speed electric motor 23.

The system 20 of this invention is so constructed and arranged that the rate of flow of fluid through the duct 21 in the direction indicated by the arrows in FIGURE 1 can be maintained at any selected rate of flow within the limits of the motor 23 in a manner hereinafter to be described.

One side of the motor 23 is interconnected to one side of a source of alternating current 24 by a lead 25, the other side of the motor 23 being interconnected to one side of a magnetic amplifier 26 by a lead 27.

The other side of the amplifier 26 is interconnected to the source of electrical power 24 by a lead 28.

The amplifier 26 includes a first saturable reactor SR1 connected on one side thereof to the lead 27 by a lead 29, the other side of the reactor SR1 being interconnected to the lead 28 by a lead 30.

A second saturable reactor SR2 is arranged in parallel with the first reactor SR1, one side of the reactor SR2 being interconnected to lead 27 by a lead 31 with the other side of the reactor SR2 being interconnected to a rectifier 33 for a purpose hereinafter described.

A semi-conductor photocell 34 is properly arranged in a manner hereinafter described and has one side thereof interconnected to the reactor SR2 on one side of the rectifier 33 by a lead 35, the other side of the photocell 34 being connected to the lead 32 on the other side of the rectifier 33 by a lead 36.

The amplifier 26 is so constructed and arranged that the same varies the current fed to the motor 23 in accordance with the variation of light rays falling on the photocell 34.

In particular, it is well known that almost all semi-conductor photocells decrease their resistance as incident light therein increases because, as the number of incident photons increases, due to light intensity increase, more photons will be absorbed and cause excitation of a greater number of the electrons or other current carriers to the energy level of the conduction band.

However, the root mean square value of the output current of the magnetic amplifier will change as a direct function in the change of impedance of the photocell 34.

Thus, as the incident light increases on the photocell 34, the speed of the motor 23 is decreased. Conversely, as the intensity of light rays on the photocell 34 decreases, the speed of the motor 23 is increased, the motor 23 being a universal motor, shaded pole motor, two-phase capacitor motor or the like.

For further details of the magnetic amplifier and its operation, see the copending application, Ser. No. 85,254, filed Jan. 27, 1961, and entitled, Magnetic Amplifier Apparatus.

A light source 37 is arranged relative to the photocell 34 and is adapted to have the light rays thereof directed to the photocell 34, one side of the light source 37 being interconnected to the lead 25 by a lead 38 while the other side of the light source 37 is interconnected to the lead 28 by a lead 39 whereby the light source 37 is placed across the source of electrical power 24.

A movable vane 40 is pivotally mounted to the duct 21 at the point 41 and is adapted to move between the light source 37 and the photocell 34 to vary the amount of light rays from the source 37 that will fall on the photocell 34 for a purpose hereinafter described, the vane 40 having a rod 42 passing into the duct 21 and carrying a baffle 43 on the lower end thereof which is received in a flow passage 44 disposed between the duct 21 and a fixed guide 45.

In this manner, the vane 40 is pivoted relative to the light source 37 and photocell 34 by the force of the fluid delivered by the impeller 22 and flowing through the flow passage 44 and against the baffle 43.

A restoring spring 46 has one end thereof interconnected to the vane 40 and the other end thereof interconnected to an adjusting screw 47 threadedly mounted in a stationary frame means 48 secured to the duct 21, the adjusting screw 47 having a knob 49 for manually adjusting the position of the screw 47 relative to the frame 48.

In this manner, the force of the restoring spring 46 tending to hold the vane 40 in the position illustrated in FIGURE 1 to block all light rays from the source 37 to the photocell 34 can be adjusted by varying the position of the adjusting screw 47 relative to the frame 48.

The operation of the system 20 of FIGURE 1 will now be described.

When it is desired to have a desired flow rate of fluid passing through the duct 21 from the impeller 22, the operator merely adjusts the adjusting screw 47 to that particular position thereof and closes a manually operated switch 50 in the lead 25 to interconnect the source of electrical power 24 to the light source 37 and to the motor 23.

As the motor 23 operates to drive the impeller 22, fluid, such as air or the like, is drawn from a suitable inlet and forced through the duct 21 in the direction indicated by the arrows whereby the fluid flow through the flow passage 44 impinges on the baffle 43 and tends to rotate the vane 40 in a clockwise direction in opposition to the force of the restoring spring 46 to increase the amount of light rays from the light source 37 falling on the photocell 34.

As previously stated, an increase in the amount of light rays falling on the photocell 34 causes a decrease in the speed of the motor 23 because the output current of the amplifier 26 is decreased whereby the fluid flow rate through the duct 21 is decreased.

Therefore, the vane 40 is continued to be moved in a clockwise direction at the ever decreasing rate as the flow of fluid decreases in the duct 21 in response to a decrease in the speed of the motor 23.

However, a point of equilibrium is eventually reached whereby the force of the restoring spring 46 prevents further clockwise movement of the vane 40 so that a constant amount of light rays is directed to the photocell 34 from the light source 37 to maintain the motor 23 at a constant speed to produce a constant flow rate through the duct 21 as determined by the setting of the adjusting screw 47.

Therefore, it can be seen that the negative feedback supplied to the amplifier 26 by the photocell 34 is a result of the function of the output of the motor 23 supplied current from the amplifier 26.

Should it be desired to decrease the rate of flow of fluid through the duct 21, the operator merely adjusts the adjusting screw 47 by the knob 49 thereof to decrease the tension on the spring 46 tending to rotate the vane 40 in a counterclockwise direction. Conversely, should it be desired to increase the flow rate through the duct 21, the operator adjusts the adjusting screw 47 to increase the tension of the restoring spring 46 tending to rotate the vane 40 in a counterclockwise direction.

While the embodiment of the system 20 illustrated in FIGURE 1 provides a manually operable adjusting means 47 to select the desired flow rate through the duct 21, it is to be understood that the flow rate through the duct 21 can be selected by other means as desired.

For example, reference is made to FIGURE 3 wherein another system of this invention is generally indicated by the reference numeral 51 and parts thereof similar to the system 20 of FIGURE 1 are indicated by like reference numerals followed by the reference letter "a."

The rate of flow of fluid through the duct 21a of the system 51 is determined by the temperature of the air surrounding a temperature sensing device.

For example, one such temperature sensing device is generally indicated by the reference numeral 52 in FIGURE 3 and comprises a bi-metal member having one end thereof attached to the stationary frame means 48a and the other end thereof attached to one end of the compression spring 46a.

In this manner, the tension on the spring 46a tending to rotate the vane 40a in a counterclockwise direction is varied in accordance with the temperature sensed by the sensing element 52 whereby the flow rate through the duct 21a is regulated in response to the temperature of the atmosphere surrounding the sensing element 52, the vane 40a performing its function in the same manner as the vane 40 previously described.

Instead of controlling the vane 40 by means of a temperature sensing element, the same may be controlled in response to pressure.

For example, reference is made to FIGURE 4 illustrating another system of this invention that is generally indicated by the reference numeral 53 and wherein parts thereof similar to the system 20 of FIGURE 1 are indicated by like reference numerals followed by the referenced letter b.

The tension of the spring 46b tending to pivot the vane 40b in a counterclockwise direction is regulated by a pressure sensing element, such as a bellows 54 having one end thereof attached to the stationary frame means 48b and the other end thereof attached to the spring 46b, the bellows 54 receiving a suitable pressure fluid from a conduit 55.

In this manner, the tension of the spring 46b is set in response to the pressure value of the pressure fluid delivered to the bellows 54 by the conduit 55 whereby the vane 40b performs its function in the same manner as the vane 40 to maintain a constant flow rate through the duct 21b in accordance with the pressure value of the pressure source independent of the system 53.

Another means for adjusting the tension setting of the spring 46 of the system 20 illustrated in FIGURE 1 could be to utilize a liquid level sensing device.

For example, another system of this invention is generally indicated by the reference numeral 56 in FIGURE 5, wherein parts thereof similar to the system 20 illustrated in FIGURE 1 are indicated by like reference numerals followed by the reference letter c.

The tension of the spring 46c tending to rotate the vane 40c in a counterclockwise direction is adapted to be regulated in response to liquid level.

In particular, a float 57 is disposed on top of a liquid 58 contained in a cylindrical device 59 whereby the position of the float 57 is determined by the level of the liquid 58 in the column 59.

The float 57 is interconnected to the spring 46c by a flexible shaft 60 passing through a stationary guide tube 61.

In this manner, the tension of the spring 46c is determined by the level of the liquid 58 in the column 59, whereby the vane 40c performed its function in the same manner as the vane 40, except that the tension on the spring 46c is determined by the level of the liquid 58 and not by a manual setting of an adjusting screw 47.

Therefore, it can be seen that the setting of the tension of the spring 46 tending to prevent clockwise rotation of the vane 40 can be in response to various physical conditions dependent on the particular system.

While the systems 20, 51, 53 and 56 previously described each has the movable vane 40 thereof varying its position in response to fluid flow through the duct 21, caused by a variable speed device 23, it is to be understood that the movement of the vane 40 can be responsive to another type of function of the output of the motor 23.

For example, reference is made to FIGURE 9 wherein another system of this invention is generally indicated by the reference numeral 62 and parts thereof similar to the system 20 illustrated in FIGURE 1 are indicated by like reference numerals followed by the reference letter d, the vane 40d being movable in response to the fluid pressure created in the duct 21d by the impeller 22d rather than in response to the flow rate through the duct 21d, as illustrated in FIGURE 1.

In particular, a bellows 63 has one end thereof interconnected to the movable vane 40d and the other end thereof interconnected to the free end of an adjusting screw 64 carried by a stationary means 65, the adjusting screw 64 having a knob 66 for adjusting the position of the bellows 63 relative to the frame 65.

The interior of the bellows 63 is interconnected to the duct 21d by a conduit 69.

When it is desired to have the impeller 22d create a certain pressure value within the duct 21d, the adjusting screw 64 is adjusted to the proper position thereof by rotating the same in the proper direction, whereby the vane 40d is moved relative to the light source 37d and photocell 34d.

As the pressure value in the conduit 21d builds up, the bellows 63 is expanded, tending to push the vane 40d to the left to open light rays from the source 37d to the photocell 34d.

When the pressure value in the duct 21d reaches the desired pressure value, the bellows 63 has positioned the vane 40d in such a position relative to the light source 37d and photocell 34d that the motor driving the impeller 22d is rotated at such a speed that the fluid delivered through the conduit 21d has the desired pressure value.

Should it be desired to decrease the pressure value in the duct 21d, the adjusting screw 64 is rotated in such a manner that the bellows 63 is moved to the left. If it is desired to increase the pressure value in the duct 21d, the adjusting screw 64 is moved in such a manner that the bellows 63 is moved to the right.

Another system of this invention is generally indicated by the reference numeral 70 in FIGURE 10, wherein parts thereof similar to the system 20 illustrated in FIGURE 1 are indicated by like reference numerals followed by the reference letter e.

The vane 40e of the system 20 is movable in response to the height of the liquid level created by a variable speed pump 71 receiving fluid from an inlet 72 and delivering the same out through an outlet conduit 73, the outlet conduit 73 being interconnected to a reservoir or the like (not shown) in which it is desired to maintain a desired liquid level therein.

A column 74 is interconnected to the outlet conduit 73 and will have a liquid level therein substantially equal to the large reservoir to which the pump 71 delivers liquid or the like.

A float 75 is disposed in the column 74 and senses the liquid level therein, the float 75 being interconnected to a tubular member 76 receiving a shaft 77 in telescoping relation therewith. The shaft 77 is interconnected to a flexible shaft 78 interconnected to the vane 40e, the flexible shaft 78 passing through a guide conduit 79.

The shaft 77 and tubular member 76 can be adjusted relative to each other to indicate the desired liquid level within the column 74 by loosening a set screw 80.

When the float 75 is disposed at the desired height in the column 74 to indicate that the fluid pump 71 is delivering the required amount of fluid to the reservoir or the like, the vane 40e is so disposed relative to the light source 37e and photocell 34e that a sufficient amount of current is supplied by the amplifier to the motor driving the fluid pump 71 to actuate the same so that the fluid pump 71 is operated at a correct speed.

However, should the liquid level in the reservoir fall below the desired liquid level thereof, the float 75 will descend and pull the vane 40e to the left, causing a decreased amount of light rays to reach the photocell 34e, whereby the motor driving the fluid pump 71 will begin to operate at a higher speed to deliver more liquid to the outlet conduit 73. As the liquid level in the column 74 rises to the desired liquid level therein, the vane 40e is moved back to increase the light from the light source 37e incident upon the photocell 34e to reduce the speed of the motor driving the fluid pump 71.

Therefore, it can be seen that the system 70 illustrated in FIGURE 10 is responsive to the function of the output of the fluid pump 71.

Another system of this invention is generally indicated by the reference numeral 81 in FIGURE 2 and parts thereof similar to the system 20 illustrated in FIGURE 1 are indicated by like reference numerals followed by the reference letter f.

Instead of the variable speed device of the system 81 being an electric motor 23, as illustrated in FIGURE 1, the variable heating device 82 illustrated in FIGURE 2 comprises a heating means or a cooling means adapted to change the temperature in a room or rooms.

The movable vane 40f is interconnected to a temperature sensing device, such as a coiled bimetallic spring 83 adapted to be adjusted by an adjusting shaft 84 in a manner conventional in the art.

Thus, the temperature sensing means 83 can be adjusted to a desired temperature setting of the shaft 84, whereby the system 81 will tend to maintain a room or rooms, where the temperature setting device 83 is located, at a substantially constant temperature, as indicated by the control shaft 84.

In particular, should it be desired to maintain the atmosphere surrounding the sensing element 83 at a temperature setting of 70° and the temperature changing means 82 is a heater means, the shaft 84 is rotated to indicate such temperature.

Should the temperature of the atmosphere surrounding the sensing means 83 be below 70°, the bi-metal spring 83 moves the vane 40f in such a position that a certain amount of light rays will be received from the source 37f on the photocell 34f to cause a certain amount of current to flow through the heating means 82 to heat up the room or rooms. The lower the temperature surrounding the temperature sensing means 83, the greater the amount of heat delivered by the heating means 82, because a smaller amount of light rays reach the photocell 34f.

As the temperature of the room approaches 70°, the bi-metal sensing means 83 moves the vane 40f relative to the light source 37f so that a greater amount of light rays are received on the photocell 34f, so that a smaller current is supplied to the heating means 82 by the amplifier 26f.

Thus, the temperature sensing means 83 moves the vane 40f relative to the light source 37f and photocell 34f to vary the current supplied to the heating means 82 to vary the heat output thereof and maintain the room or rooms at a substantially constant temperature.

Similarly, if the temperature changing means 82 is a cooling means, such as an air conditioner or the like, the temperature sensing element 83 operates the vane 40f in a like manner to vary the output of the temperature changing means 82 to maintain the room or rooms at the desired constant temperature.

In all the embodiments of the various systems of this invention previously described, the feedback through the amplifier thereof is derived and regulated in response to a function of the output of the output device controlled thereby, whereby the various systems are of the closed loop type.

Further, in each of the systems previously described, the movable vane thereof is moved in such a manner that the movement thereof in response to an increase in output from the variable output device decreases the current supplied to the output device to decrease the output thereof, whereby a negative feedback system is provided.

However, by shifting the photocell and light source to the right relative to the vane in FIGURES 1, 3, 4, 5, 10 and to the left in FIGURE 9, the vane can be so constructed and arranged that the same tends to decrease the amount of light falling on the photocell as the output of the variable output device increases. Thus, the feedback systems of this invention can be converted from negative feedback systems to positive feedback systems.

Further, the various systems of this invention could be so constructed and arranged that there is no feedback loop created, whereby the loops thereof are opened.

In particular, reference is made to FIGURE 6, illustrating such an open loop system, generally indicated by the reference numeral 81' and parts thereof similar to the system 20 illustrated in FIGURE 1 are indicated by like reference numerals followed by the reference letter g.

In the system 81' illustrated in FIGURE 6, the movable vane 40g is pivoted at the point 41b but is not interconnected to any baffle means disposed in the duct 21g.

Instead, the vane 40g is merely interconnected to one end of a temperature sensing means 82', such as a bimetal spring means, the other end of the bi-metal 82' being interconnected to an adjusting screw 83' carried by a stationary frame means 84'.

Thus, the vane 40g is movable relative to the light source 37g and photocell 34g in response to the temperature of the atmosphere surrounding the temperature sensing means 82', which is not a function of the output of the impeller 22g of the system 81'.

The operation of the system 81' will now be described.

When it is desired to have the impeller 22g create a certain flow rate in the duct 21g when the temperature surrounding the temperature sensing element 82' is at a particular temperature, the adjusting screw 83' is adjusted to that particular setting whereby the temperature surrounding the sensing element 82' controls the vane 40g relative to the light source 37g and photocell 34g to cause the motor 23g to operate at a certain speed.

Thereafter, as the temperature changes, the vane 40g either increases or decreases the speed of the motor 23g, whereby the flow through the duct 21g is correspondingly increased or decreased.

Another open loop system of this invention is generally indicated by the reference numeral 85 in FIGURE 7, wherein parts thereof similar to the system 20 illustrated in FIGURE 1 are indicated by like reference numerals followed by the reference letter h.

In the system 85 illustrated in FIGURE 7, the movable vane 40h is interconnected to one side of a bellows 86 having the other side thereof interconnected to an adjusting screw 87 carried by a stationary frame member 88.

The interior of the bellows 86 is interconnected to a suitable source of pressure fluid by a conduit 89, the source of pressure fluid being independent of the function of the output of the load device controlled by the vane 40h.

Thus, it can be seen that the vane 40h is movable relative to the light source 37h and photocell 34h solely in response to the pressure value of a source and independent of the load device controlled by the vane 40h.

Should it be desired to set the bellows 86 to operate the load device at another rate when the bellows 86 receives a certain pressure value, the adjusting screw 87 is rotated in the proper direction to re-set the bellows 86.

Another open looped system of this invention is generally indicated by the reference numeral 90 in FIGURE 8, wherein parts thereof similar to the system 20 illustrated in FIGURE 1 are indicated by like reference numerals followed by the reference letter j.

The movable vane 40j of the system 90 is carried on a shaft 91 telescopically received in a tubular member 92 interconnected to a float 93.

The float 93 is responsive to the liquid level in a column 94, whereby the position of the vane 40j relative to the light source 37j and photocell 34j is regulated in response to the liquid level in the column 94.

Therefore, it can be seen that the output of the load device controlled by the vane 40j is in response to liquid level and independent of the function of the load device.

Should it be desired to have the load device function in a different manner when a certain liquid level is reached, the shaft 91 can be adjusted relative to the tubular member 92 by the set screw 95.

Therefore, it can be seen that open and closed looped systems of this invention have been provided wherein a photocell receiving light from a light source varies the output of a variable output device in relation to a desired condition.

While the form of the invention now preferred has been disclosed as required by the statutes, other forms may be used, all coming within the scope of the claims which follow.

What is claimed is:

1. In combination, a source of electrical power, a light source interconnected to said source of electrical power, an impeller for creating a flow of fluid, a variable speed electric motor interconnected to said impeller for driving the same, means interconnecting said source of power to said motor, a photocell interconnected to said means and varying the speed of said motor in response to variations in the amount of light received by said photocell from said light source, means responsive to the flow of fluid to vary the amount of light received by said photocell from said light source, and means for regulating said means responsive to the flow of fluid to tend to maintain a selected amount of flow of said fluid.

2. In combination, a source of electrical power, a light source interconnected to said source of electrical power, a duct, an impeller for forcing a fluid through said duct, a variable speed electric motor interconnected to said impeller for driving the same, an amplifier interconnecting said motor with said source of power, a photocell disposed adjacent said light source and being interconnected to said amplifier to vary the speed of said motor in response to variations in the amount of light received by said photocell from said light source, a movable vane adapted to move between said light source and said photocell to vary the amount of light received by said photocell from said light source, a baffle disposed in said duct and movable relative thereto in proportion to the amount of flow of said fluid through said duct, said baffle being interconnected to said vane to vary movement of said vane, spring means for tending to hold said vane in said one position thereof, and means for varying the force of said spring means tending to hold said vane in said one position thereof to vary the amount of flow of said fluid delivered through said duct by said impeller.

References Cited

UNITED STATES PATENTS

| | | | |
|---|---|---|---|
| 1,670,313 | 5/1922 | Oswald | 318—481 X |
| 2,065,421 | 12/1936 | Bernarde | 318—480 |
| 2,112,682 | 3/1938 | Ryder | 318—481 |
| 2,606,297 | 8/1952 | Sweet | 318—482 X |

ORIS L. RADER, *Primary Examiner.*

C. E. ROHRER, T. E. LYNCH, *Assistant Examiners.*